A. BECK.
CAMERA.
APPLICATION FILED APR. 17, 1916.

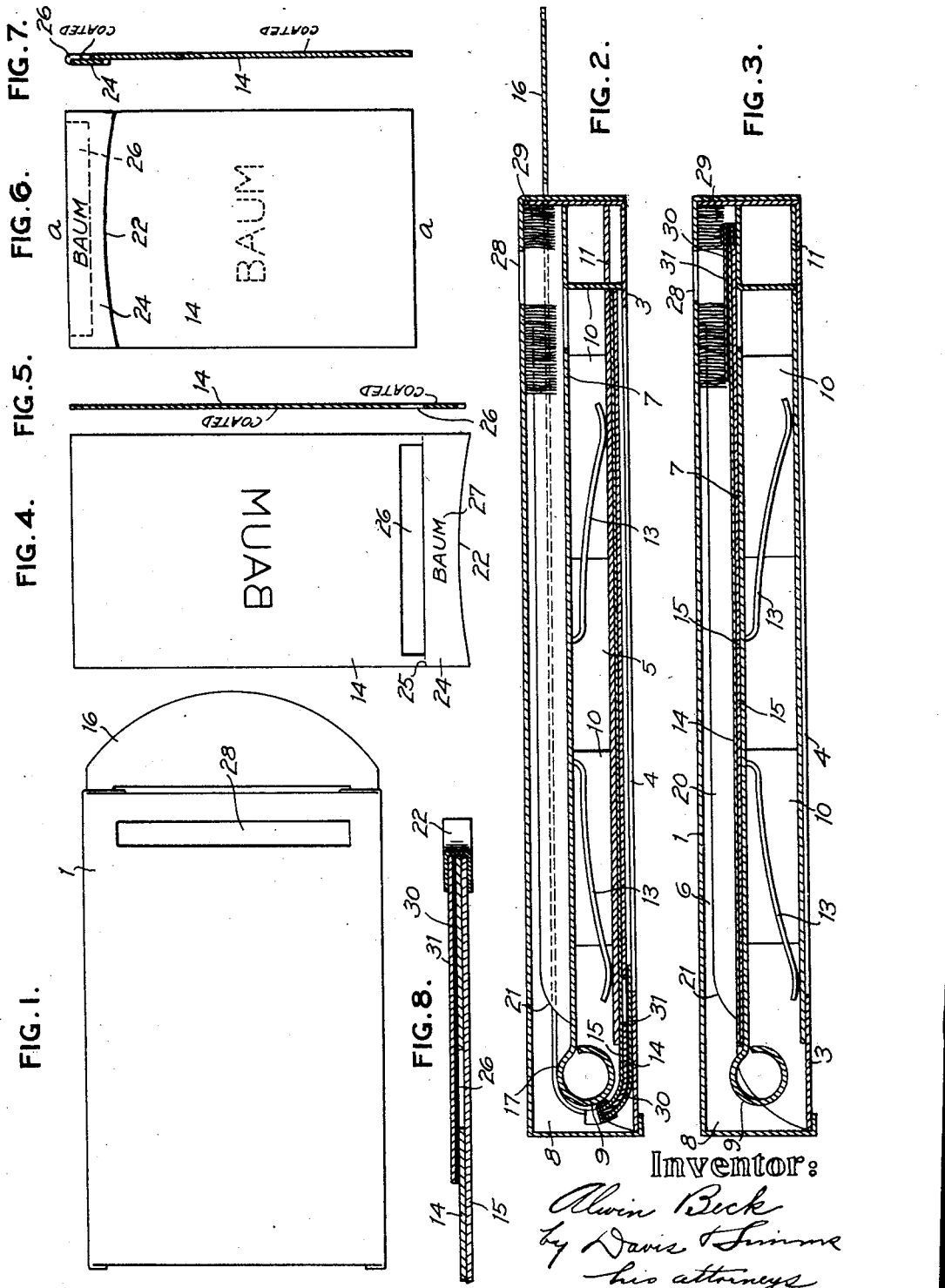

1,311,676.

Patented July 29, 1919.
2 SHEETS—SHEET 2.

Inventor:
Alvin Beck
by Davis & Simms
his attorneys

UNITED STATES PATENT OFFICE.

ALWIN BECK, OF ROCHESTER, NEW YORK, ASSIGNOR OF ONE-HALF TO HAROLD S. SIMMS, OF ROCHESTER, NEW YORK.

CAMERA.

1,311,676.  Specification of Letters Patent.  Patented July 29, 1919.

Original application filed May 10, 1915, Serial No. 27,000. Divided and this application filed April 17, 1916. Serial No. 91,601.

*To all whom it may concern:*

Be it known that I, ALWIN BECK, a subject of the Emperor of Germany, and resident of Rochester, in the county of Monroe and State of New York, have invented certain new and useful Improvements in Cameras, of which the following is a specification.

The present invention relates to photographic cameras and more particularly to the type employing sensitized material in the form of films, an object of this invention being to provide a film pack constructed in such a manner that the films may receive identifying marks. A further object of my invention is to provide a film pack in which the films are transferred from the exposure chamber to the dark or storage chamber to occupy the same order in the latter chamber as they occupied in the exposure chamber but with their faces relatively reversed. A still further object of the invention is to provide means for automatically severing or detaching the pulling tabs from the films in film packs, when the film has been transferred to the dark chamber.

To these and other ends, the invention consists in certain parts and combinations of parts all of which will be hereinafter described, the novel features being pointed out in the appended claims.

In the drawings:—

Figure 1 is a plan view of the rear face of a film pack constructed in accordance with the present invention;

Fig. 2 is a longitudinal section through the pack with a single film therein, the film being arranged in exposing position;

Fig. 3 is a view similar to Fig. 2, showing the film shifted to the dark chamber;

Fig. 4 is a detail view of a film showing the relation of the identifying portion to the coated portion;

Fig. 5 is a sectional view of the film;

Fig. 6 is a detail view illustrating the manner in which the matter on the identifying portion is caused to correspond with the negative;

Fig. 7 is a vertical section through the film;

Fig. 8 is an enlarged detail view through the identifying portion of the film and the surrounding parts;

Figure 13:
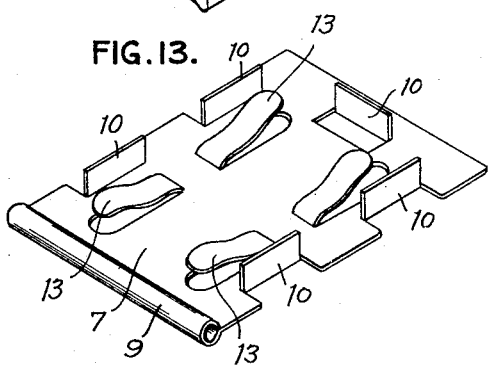
Fig. 13 is a detail view of the partition which divides the film pack into two chambers.

Referring more particularly to the drawings, 1 indicates one member of the film pack casing, said member being provided with surrounding flanges, one of which may be cut away at 2 at its ends for the passage of the pulling tabs, as will be hereinafter set forth. Received within this member 1 is a member 3 provided with an exposure opening 4 through which the films are exposed. This casing may be divided into two chambers 5 and 6 by a partition 7 shown in detail in Fig. 13, said partition being spaced at 8 from one end of the casing to provide a passageway between the chambers, and being rolled at 9 at such end to facilitate the passage of the films from the exposure chamber 5 to the storage or dark chamber 6. This partition may be held in spaced relation to the exposure opening 4 by lugs 10 which are struck up from the partition to coöperate with the wall of the casing about the exposure opening. Also arranged in the exposure chamber is a follower plate 11 preferably formed with slits 12 to operate on the lugs 10 and held toward the exposure opening by springs 13 preferably struck up from the partition 7, as shown in Fig. 13, to bear against the inner face of the follower plate.

The film 14, which will be hereinafter specifically described, is secured to a backing sheet 15 with its uncoated side toward said backing sheet. This film and backing sheet are not so wide as the casing but are of a size to fit within the lugs 10, which thereby serve to center the films within the casing with relation to the exposure opening 4. From the backing sheets and films, the pulling tabs 16 extend, each being connected to opposite sides of the backing sheet near one end by two parallel strips 17, which are spaced apart a distance at least as great as the widths of the film and the backing sheet, to provide an opening through which the detached films and thin backing sheets may pass. While each film and its backing sheet lie in the exposure chamber, the connecting strips 17 lie in channels 18 formed on opposite sides of the storage or dark chamber. Preferably these channels are constructed by bending the opposite side flanges of the casing member 3 inwardly at 19 and thence upwardly at 20, the upwardly-extending portions having their ends 21 curved and serving as guides for directing the film and its backing toward the top of the dark or storage chamber in order that the films may lie in the same position within the dark or storage chamber as they occupied in the exposure chamber, and not as in the ordinary commercial structures in reverse order. This is caused by the connecting portions between the strips 17 and the backing sheets engaging the curved ends 21 and riding on the upper edges of the flange 20 toward the opposite ends of said flanges. In order to prevent the buckling of the forward edge of the film and backing sheet, said edge is curved at 22.

Figure 9:
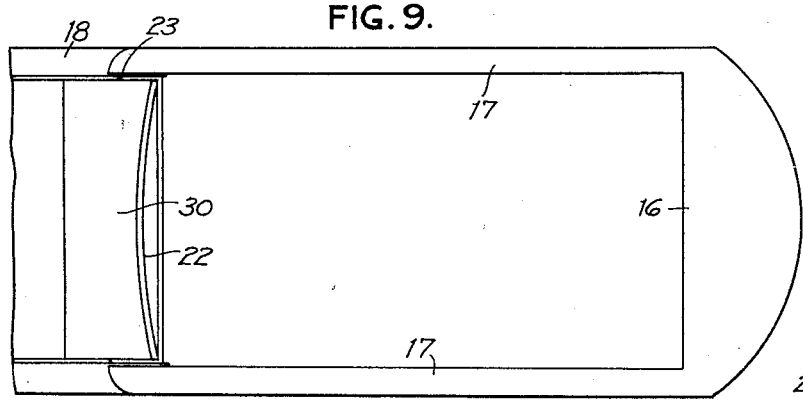
Fig. 9 is an enlarged detail view showing the manner in which the pulling tab is removed from the film.
Figure 10:
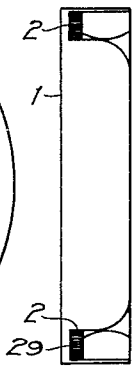
Fig. 10 is a detail view of one end of the film pack.
Figure 11:
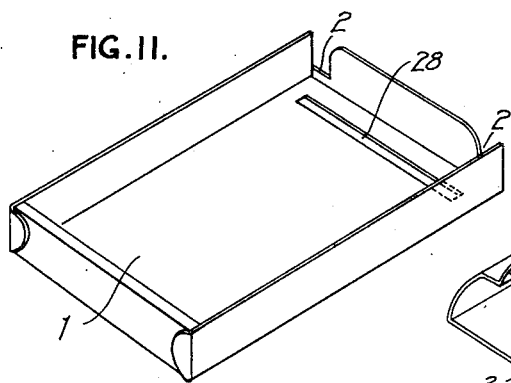
Figs. 11 and 12 are perspective views of the two parts of the casing of the film pack.
Figure 12:
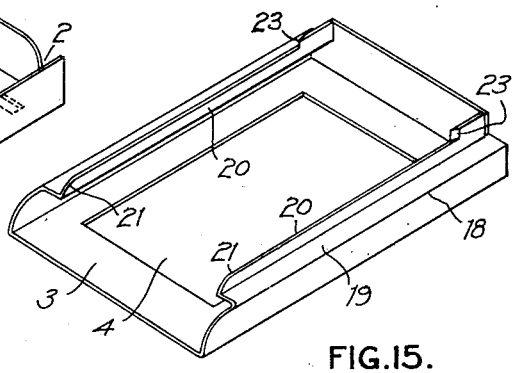

Another feature of this invention is the automatic severing of the tabs from the backing sheet as the film and its backing sheet reach proper positions within the storage chamber. This is preferably accomplished by two knives or stationary cutters 23 arranged at the ends of the guides 20 to cut the strips 17 at their points of connection with the backing sheet, as will be seen from Fig. 9 of the drawings.

The features heretofore described may be used with or without the film identifying feature now to be described, which forms the subject matter of an application filed by me on May 10th, 1915, Serial No. 27,000, of which this application is a division. Each film is, as usual, coated on one side with a sensitized material. Preferably, a portion of the film on the coated side is left uncoated at 24. This identifying portion, however, is coated on the opposite side of the film so that if the film be bent on the line 25, the two coated portions will be disposed in the same direction and the two uncoated portions will be disposed in the opposite direction, as shown in Figs. 6 and 7. Preferably, the film is cut away at 26 so that the identifying matter 27 will have but one thickness of film interposed between it and the print paper. The identifying matter 27 may be exposed upon the identifying portion of the film in any suitable manner. In this instance, the film pack casing is provided with a slot or opening 28 which opens into the dark or storage chamber at one end of the latter at the end adjacent the tabs. About this opening, any light-excluding device, such as the pile fabric 29, may be arranged. Each film may also carry a small strip of carbon paper 30 secured over the identifying portion in engagement with the uncoated face of the latter, and over this carbon paper a small piece or strip of red paper 31, or other material not readily permitting the passage of light, is arranged. After a film has been carried to the storage chamber, the identifying portion 24 will lie beneath the opening or slot 28, and if a pencil be introduced through said slot, any suitable identifying matter may be written upon the red paper. Under ordinary conditions this red paper and the carbon sheet will prevent the passage of light to the identifying portion of the film, but the action of the pencil causes the bruising of the carbon sheet so that light may be passed through the red paper and the carbon sheet onto the identifying portion of the film through the bruised portion of the carbon sheet. Of course, this exposed matter on the identifying portion of the film will show up after developing the film and its relation to the picture portion or exposed field of the film will be the same as that shown in Fig. 4, the picture portion being a negative while the identifying portion is positive. The proper relation between these two portions is obtained by bending the film, as shown in Figs. 6 and 7.

Figure 15:
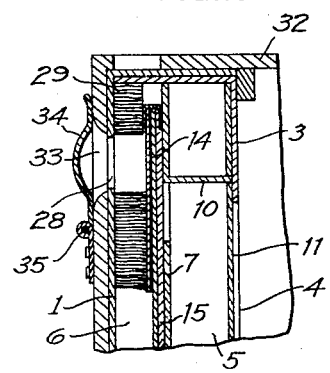
Fig. 15 is a detail view of a portion of a camera in which the film pack is adapted to be used.
Figure 14:
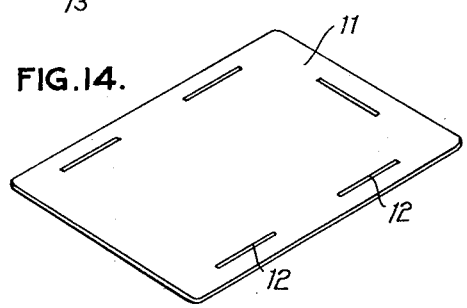
Fig. 14 is a perspective view of a follower plate.

As the film pack is arranged in a camera casing, as for instance, as shown in Fig. 15, the casing being indicated at 32, it is desirable to provide the casing with an opening 33 to register with the opening 28 in the casing of the film pack. This opening 33 may be closed by a cover 34 hinged to the casing at 35 and held in closed position by any suitable means.

The operation of the invention will be understood from the foregoing but it may be summarized as follows: The film occupies the position shown in Fig. 2 while the exposure is being made, and after the exposure the tab 16 is pulled, drawing the film from the exposure chamber 5 through the passageway 8 to the storage or dark chamber. In passing into the dark chamber those portions of the connecting pieces 17 which are attached to the film backing ride onto the curved portions 21, and then along the guides 20, until the knives or cutters 23 are reached, when a continued pull on the tab causes the connecting portions 17 to become detached automatically from the film-backing and the film with its backing to come to rest between the guides 20. The curve guide 21 causes each film and its backing to pass above the other films in the dark or storage chamber and, in this way, the films occupy the same order with their faces relatively reversed in the storage chamber as they occupied in the exposure chamber. This operation of the films causes the identifying portion 24 of each film to be presented under the slot 28 immediately after exposure. In this position a pencil may be introduced through the opening 28 to mark upon the paper 31, thus causing the bruising of the carbon paper and permitting light to pass to the identifying portion 24. As the writing is positive and on the same side of the film with the negative they both may be made to correspond by folding the identifying portion over the slot in the film, as shown in Fig. 6.

I believe myself to be the first to construct a camera and its film pack in such a manner that identifying marks may be made on the individual films of the pack after each exposure. The film pack is of novel construction and gives a new arrangement of the films therein, this arrangement being particularly advantageous for marking the films for identification. The film pack also has provision for automatically removing the pulling tabs by the act of pulling on the tabs.

It will be noted that each of the films will be cut from the pulling tabs at the same point so that said films will be caused to be positioned properly each time below the slot in the casing.

What I claim as my invention and desire to secure by Letters Patent is:—

1. A film pack embodying a casing formed with an exposure chamber and a storage chamber, films in said exposure chamber, and means for directing the films to cause them to occupy the same order within the storage chamber as they occupied in the exposure chamber with their faces relatively reversed.

2. A film pack comprising a casing having an exposure chamber and a storage chamber, films movable from the exposure chamber to the storage chamber, and guides for the films arranged at opposite sides of the storage chamber and having curved ends adjacent the communication between the two chambers.

3. A film pack comprising a casing having an exposure chamber and a storage chamber, films movable from said exposure chamber to said storage chamber, parallel strips attached to said films, pulling tabs attached to said strips, and guides for said strips adapted to so direct the movement of the films that the latter will be superimposed in the storage chamber in the same sequence as in the exposure chamber, but with their faces relatively transposed.

4. A film pack embodying a two-part casing, one of said parts being provided with an exposure opening and having flanges at opposite sides each extending laterally to the plane of the opening, thence inwardly parallel with the plane of the opening and thence laterally to the plane of the opening, the last named portions having curved ends and providing channels on the outer sides thereof, a partition abutting those portions of the flanges parallel with the plane of the opening and spaced at one end from an end wall of the casing, in order to provide an exposure chamber and a storage chamber communicating with said exposure chamber, films arranged in the exposure chamber and movable into the storage chamber through such communication, and strips lying in the channels and connected to the films.

5. A film pack comprising a casing having an exposure chamber and a storage chamber communicating with the exposure chamber, channels being provided on opposite sides of the storage chamber, films arranged in the exposure chamber, and pulling tabs having strips lying in the channels and connected to opposite sides of the films.

6. A film pack comprising a casing having an exposure chamber and a storage chamber communicating with the exposure chamber, films arranged in the exposure chamber and movable to the storage chamber, and guides at opposite sides of the storage chamber for directing the films to cause them to occupy the same order in the storage chamber as they occupied in the exposure chamber with their faces reversed.

7. In combination with a film, a backing sheet to which the film is secured, and a pulling tab having a pair of strips connected to opposite sides of the backing sheet near one end of the latter, the distance between the opposed edges of the strips being as great as the width of the film.

8. A camera having a chamber adapted to receive a film pack, said chamber being provided with a slot in one of its walls opening to the exterior of the camera, and a film pack arranged in said film pack chamber and provided with a slot to which its films may successively be brought, said film pack opening registering with the opening in the film pack chamber so that films of the pack may be provided with identification marks without being removed from the camera.

9. A film pack comprising a casing having an exposure chamber and a storage chamber, films movable from the exposure chamber to the storage chamber, backing sheets attached to said films, and pulling tabs attached to the backing sheet, there being provided openings between the pulling tabs and the backing sheets through which the backing sheets and the films may pass when they enter the storage chamber.

10. A film pack comprising a casing having an exposure chamber and a storage chamber, films movable from the exposure chamber to the storage chamber, pulling tabs connected to said films, and means for automatically severing the tabs from the films when the latter have been transferred to the storage chamber.

11. A film pack comprising a casing having an exposure chamber and a storage chamber, films movable from the exposure chamber to the storage chamber, pulling tabs having strips connected with the film, and knives arranged in the path of said strips to sever them from their connection with the films.

12. A film pack comprising a casing having an exposure chamber and a storage chamber, films movable from the exposure chamber to the storage chamber, backing sheets to which said films are secured, pulling tabs having strips connected to the side edges of the tabs near one end of each of the latter, and knives arranged in the path of the strips to sever them from the backing sheets.

13. A film pack comprising a casing having an exposure chamber and a storage chamber, films movable from the exposure chamber to the storage chamber, pulling tabs connected to the films, and severing means located in the path of such tabs to sever them from their connection with the films after the films have been transferred to the storage chamber.

14. A film pack comprising a casing provided with a slot and with an exposure chamber and a storage chamber, and films movable from the exposure chamber to the storage chamber and having a portion adapted to lie in proximity to said slot to receive identifying marks.

15. A film pack comprising a casing provided with an exposure chamber and a storage chamber and with a slot in said storage chamber, and films movable from the exposure chamber to the storage chamber so that a portion of each film may be brought in proximity to the slot for receiving identifying marks.

16. A film pack comprising a casing provided with an exposure chamber and a storage chamber, and also with a slot in the storage chamber, films movable from the exposure chamber to the storage chamber and having a portion adapted to lie in proximity to the slot to receive identifying marks, and means for causing the films to occupy the same relative positions in the storage chamber that they occupied in the exposure chamber.

17. A film pack comprising a casing provided with an exposure chamber and a storage chamber, films movable from the exposure chamber to the storage chamber, means for causing the films to occupy the same relative positions in the storage chamber as they occupied in the exposure chamber, and means permitting the making of identifying marks on portions of the films while the latter are in the exposure chamber.

ALWIN BECK.

Copies of this patent may be obtained for five cents each, by addressing the "Commissioner of Patents, Washington, D. C."